United States Patent [19]

Ichikawa et al.

[11] Patent Number: 5,127,238

[45] Date of Patent: Jul. 7, 1992

[54] AUTOMOBILE AIR CONDITIONER

[75] Inventors: Toru Ichikawa, Kusatsu; Hideo Nishihata, Otsu; Nobuyuki Yamamoto, Hiroshima; Naoki Nakamura, Moriyama, all of Japan

[73] Assignee: Matsushita Electric Industrial Co., Ltd., Osaka, Japan

[21] Appl. No.: 602,092

[22] Filed: Oct. 25, 1990

[30] Foreign Application Priority Data

| Oct. 25, 1989 | [JP] | Japan | 1-278847 |
| Oct. 26, 1989 | [JP] | Japan | 1-280557 |
| Oct. 26, 1989 | [JP] | Japan | 1-280558 |

[51] Int. Cl.$^5$ .................................. B60H 1/32
[52] U.S. Cl. ........................... 62/244; 415/53.1; 415/53.3; 454/155
[58] Field of Search ............ 62/244; 98/2.11, 40.24, 98/DIG. 10; 415/53.1, 53.3

[56] References Cited

U.S. PATENT DOCUMENTS

| 3,181,415 | 5/1965 | Laing | 415/53.1 X |
| 3,305,665 | 2/1967 | Laing | 415/53.1 X |
| 3,322,333 | 5/1967 | Laing | 415/53.1 |
| 4,078,870 | 3/1978 | Keller et al. | 415/53.1 |
| 4,705,453 | 11/1987 | Hopfensperger | 415/53.1 X |
| 4,898,003 | 2/1990 | Ichikawa et al. | 62/244 |
| 4,913,622 | 4/1990 | Tanaka et al. | 415/53.1 X |
| 4,958,504 | 9/1990 | Ichikawa et al. | 62/244 |

FOREIGN PATENT DOCUMENTS

| 197938 | 9/1986 | Japan | 98/40.24 |
| 46157 | 2/1987 | Japan | 98/40.24 |
| 63-22213 | 2/1988 | Japan . | |
| 63-24011 | 2/1988 | Japan . | |

Primary Examiner—Harold Joyce
Attorney, Agent, or Firm—Wenderoth, Lind & Ponack

[57] ABSTRACT

An automobile air conditioner for use in an automobile which has a generally rectangular box casing curved along a curvature of the ceiling of automobile and having an air inlet and an air outlet defined at opposite sides thereof, a generally elongated evaporator accommodated in the casing adjacent to the air inlet, a cylindrical blade wheel connected with a motor with their axes in a alignment for generating air flow through the evaporator, a stabilizer extending under the fan unit toward the air outlet, an air flow deflector for controlling the direction of air flow between the fan unit and the air outlet, and a diffuser with a beam on its lower surface for controlling the air flow above the cylindrical blade wheel toward the air outlet. By this structure, a flat and compact type of air conditioner for use in an automobile is provided.

7 Claims, 15 Drawing Sheets

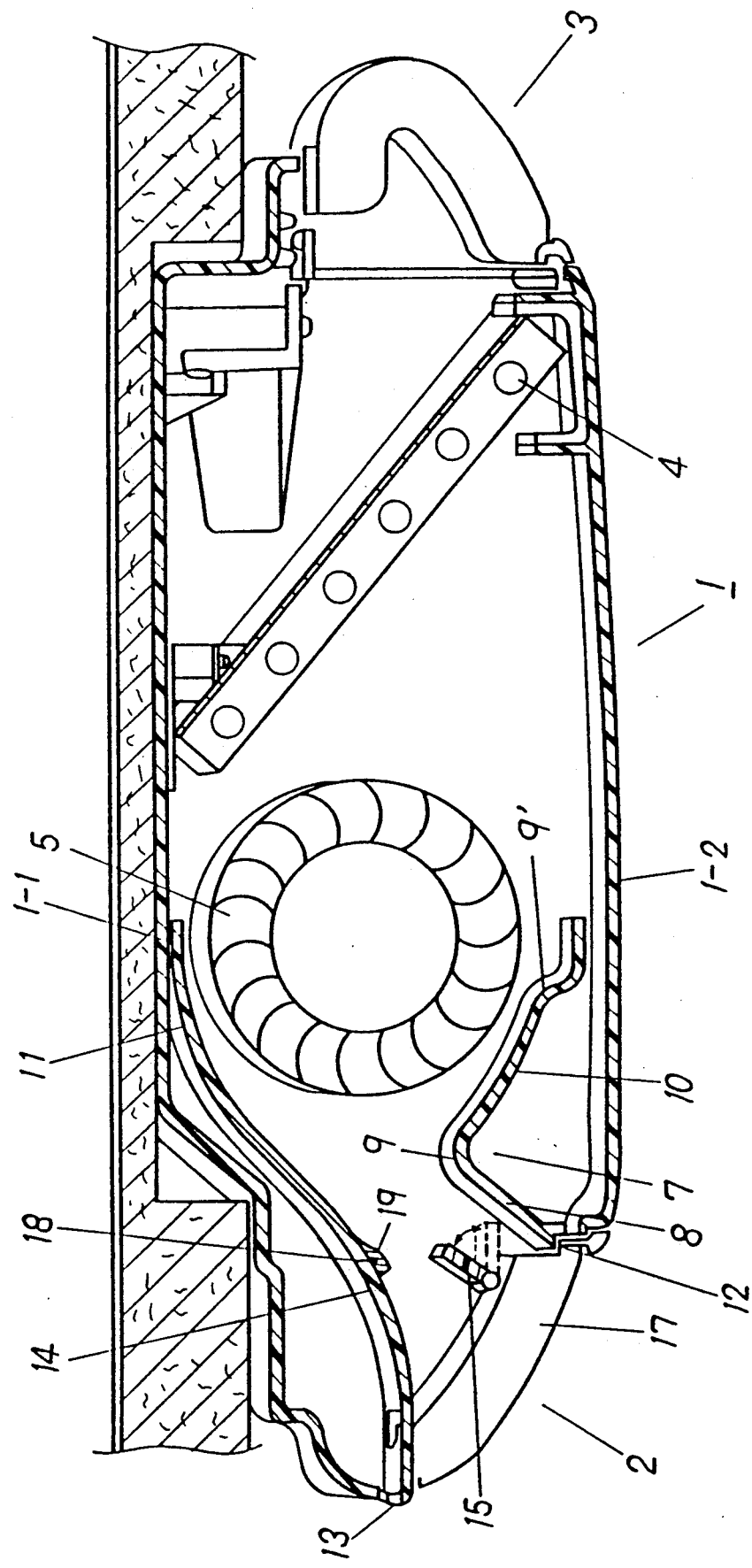

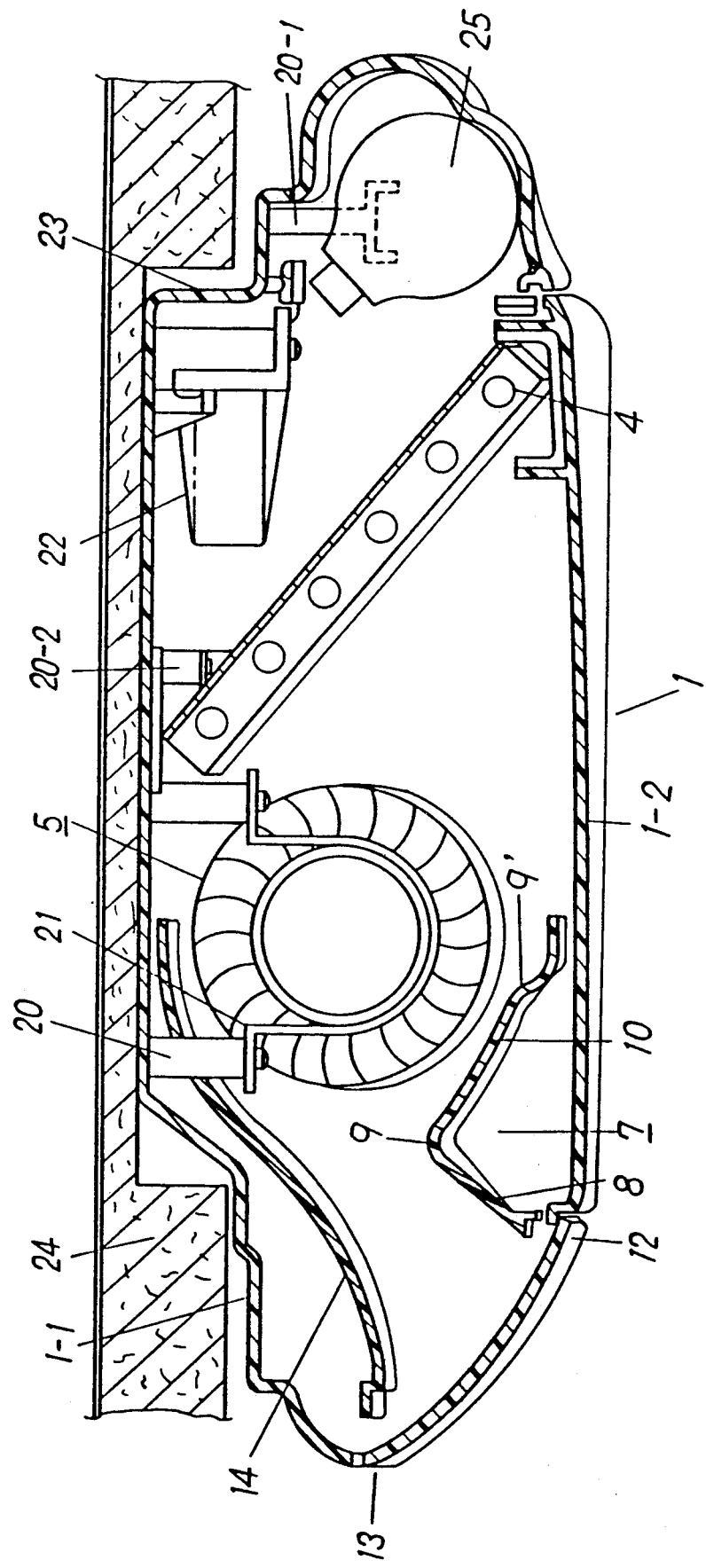

Fig. 8A      Fig. 8B      Fig. 8C
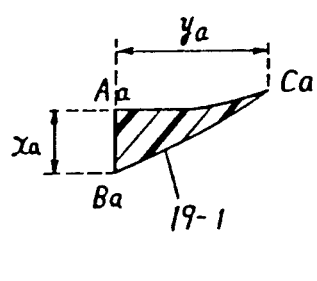
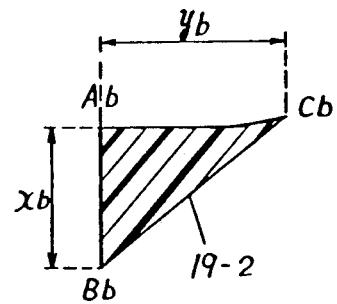
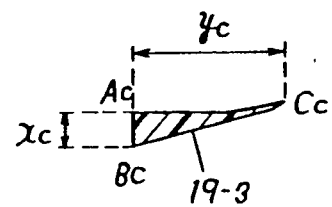
Fig. 8D      Fig. 8E
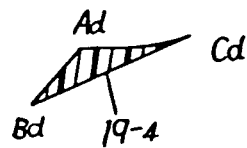
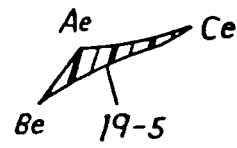

AUTOMOBILE AIR CONDITIONER

BACKGROUND OF THE INVENTION

1. Field of the Invention

The present invention generally relates to an air conditioner and, more particularly, to an air conditioner particularly suited for use in an automobile.

2. Description of the Prior Art

An automobile air conditioner of a type installed in the ceiling in the passenger's compartment of an automobile body structure is well known in the art and is disclosed in, for example, the Japanese Laid-open Utility Model Publications No. 63-22213 and No. 63-24011 published in 1988. According to these publications, the prior art automobile air conditioner employs a blower in the form of a centrifugal fan and has an air outlet grille on the front face thereof.

Where the centrifugal fan is employed for the blower, the assembly as a whole tends to be relatively bulky, and the thickness thereof as measured from the ceiling down to the bottom of the assembly is difficult to reduce. As is well known to those skilled in the art, the blower assembly employing a centrifugal fan is of a construction wherein air is sucked into the assembly in an axial direction along the shaft about with which the fan rotates and is discharged from the circumference of the assembly radially outwardly, i.e., in a centrifugal direction. Therefore, reduction of the diameter of the centrifugal fan is not possible.

In particular, the first mentioned Japanese publication (No. 63-22213/1988) discloses the blower assembly with the fan shaft extending horizontally, i.e., generally parallel to the ceiling. The horizontal arrangement of the fan shaft permits a fan casing for encasing the centrifugal fan to protrude downwards from the ceiling and into the interior of the automobile body structure through a distance corresponding to the diameter of the centrifugal fan.

Also, the width of the centrifugal fan as measured in a direction parallel to the fan shaft is considered of an optimum value if it is generally equal to the radius of the centrifugal fan. Accordingly, where the blower assembly is installed with the fan shaft extending vertically, i.e., generally perpendicular to the ceiling, such as disclosed in the second mentioned Japanese publication (No. 63-24011/1988), the blower assembly not only requires a width somewhat proportional to the diameter of the centrifugal fan, but also the installation of a fan drive motor in such a manner as to be oriented in a direction parallel to the fan shaft. Because of these factors, the thickness of the blower assembly as measured from the ceiling down to the bottom of the blower assembly cannot be reduced.

Since the height of the automobile body to the ceiling is generally limited from the standpoint of body aerodynamics, body stability, and other factors, it has long been considered a problem to reduce the bulkiness of the air conditioner in order to ensure the maximum space in the passenger's compartment with the air conditioner installed.

With the above described conventional automobile air conditioner, although it is possible to supply air in the front direction of the main body, and change the air flow direction to the left or light by changing the direction of blades installed on an outlet grille, it is impossible to supply air in a slanted direction.

Furthermore, the centrifugal fan and the drive motor used for the conventional automobile air conditioner are bulky as described above. In order to prevent the fan and motor from vibrating and to ensure stable blowing, it is necessary to increase the rigidity of the casing for fan and motor, resulting further in a bulky size of the air conditioner.

SUMMARY OF THE INVENTION

The present invention has been developed with a view to substantially solving the above described disadvantages and has for its essential object to provide an improved automobile air conditioner which has a compact structure.

In accomplishing these and other objects, an automobile air conditioner for use in an automobile having a ceiling according to the present invention comprises a generally rectangular box shaped casing curved along the curvature of the ceiling, and includes a first wall and a second wall to define an air inlet and an air outlet at opposite sides thereof. The air outlet is configured by a first edge along one side of the first wall and a second edge along one side of the second wall.

Such an automobile air conditioner also comprises a generally elongated evaporator accommodated in the casing adjacent the air inlet having one end thereof fixedly connected to the first wall and a fan means accommodated in the casing at a position between the evaporator and the air outlet, for generating air movement in a direction from the air inlet to the air outlet. The fan means has a cylindrical blade wheel with an axis thereof extending substantially parallel to the first wall and perpendicular to the direction of air movement.

The automobile air conditioner further comprises a stabilizer located adjacent the second wall. The stabilizer comprises a lower diffuser rising from the second edge at a predetermined elevation angle, a guide wall portion having one side thereof integrally connected to the lower diffuser through a ridge portion for defining an air guide space between the guide wall portion and the cylindrical blade wheel such that the guide space is gradually narrowed forwards toward the other side of the guide wall portion remote from the one side. The ridge portion extends approximately parallel to the axis and curved correspondingly with the curvature of the casing, and aligned equidistantly from the axis.

Alternatively, the stabilizer can be arranged such that the lower diffuser rises from the second edge with varied elevation angle. In this case, the ridge portion should extend straight and parallel to the axis of the cylindrical blade wheel.

Furthermore, a fan unit for use in an automobile air conditioner according to the present invention comprises an elongated stabilizer having supports at opposite ends thereof. The stabilizer comprises a lower diffuser rising from the second edge at a predetermined elevation angle and a guide wall portion having one side thereof integrally connected to the lower diffuser through a ridge portion, for defining an air guide space between guide wall portion and the cylindrical blade wheel such that the guide space is gradually narrowed towards the other side of the guide wall portion remote from the one side. The ridge portion extends approximately parallel to the axis, and is curved correspondingly with the curvature of the casing. The ridge portion is aligned equidistantly from the axis, and the guide wall portion extending between the supports.

Such a fan unit also comprises an elongated rear guide integrally connected to a smooth curved upper diffuser and being positioned against the stabilizer to form a compartment therein.

The fan unit further comprises a cylinder blade wheel held in the compartment with the shaft thereof being held in the supports, and a motor connected to the cylindrical blade wheel with the axis of the motor in alignment with the axis of the cylinder blade wheel.

Alternatively, the stabilizer can be arranged such that the lower diffuser from the second edge rises at a varied elevation angle. In this case, the ridge portion should extend straight and parallel to the axis of the cylindrical blade wheel.

BRIEF DESCRIPTION OF THE DRAWINGS

These and other objects and features of the present invention will become clear from the following description of a preferred embodiment thereof with reference to the accompanying drawings, in which:

FIG. 1C is a cross-sectional view taken along a line IC—IC shown in FIG. 1A;

FIG. 1D is a cross-sectional view taken along a line ID—ID shown in FIG. 1A;

FIGS. 8A, 8B, 8C, 8D and 8E are cross-sectional views of the protruding part shown in FIG. 1C;

DETAILED DESCRIPTION OF THE EMBODIMENTS

An automobile air conditioner according to a first preferred embodiment of the present invention is described with reference to the accompanying drawings.

Figure 1A:
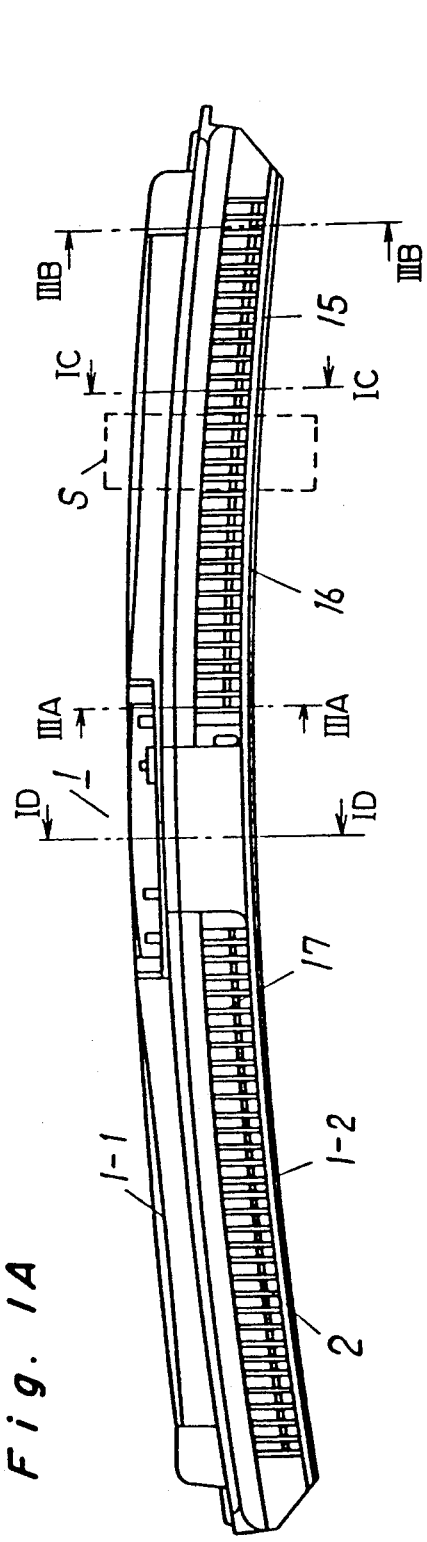
FIG. 1A is a front elevational view of an automobile air conditioner according to a preferred embodiment of the present invention.

Referring to FIG. 1A showing an elevational view of the automobile air conditioner according to the present invention, a main body 1 includes an upper casing 1—1 and a lower casing 1-2 defining a widely elongated rectangular box like shape which is arced in accordance with the curvature of the ceiling of the automobile.

The main body 1 has two air outlets 2 separated at the center thereof. Provided in each air outlet 2 are a plurality of blades 17 and an up-downward deflector 15 to form an air outlet grill 16.

Figure 1B:
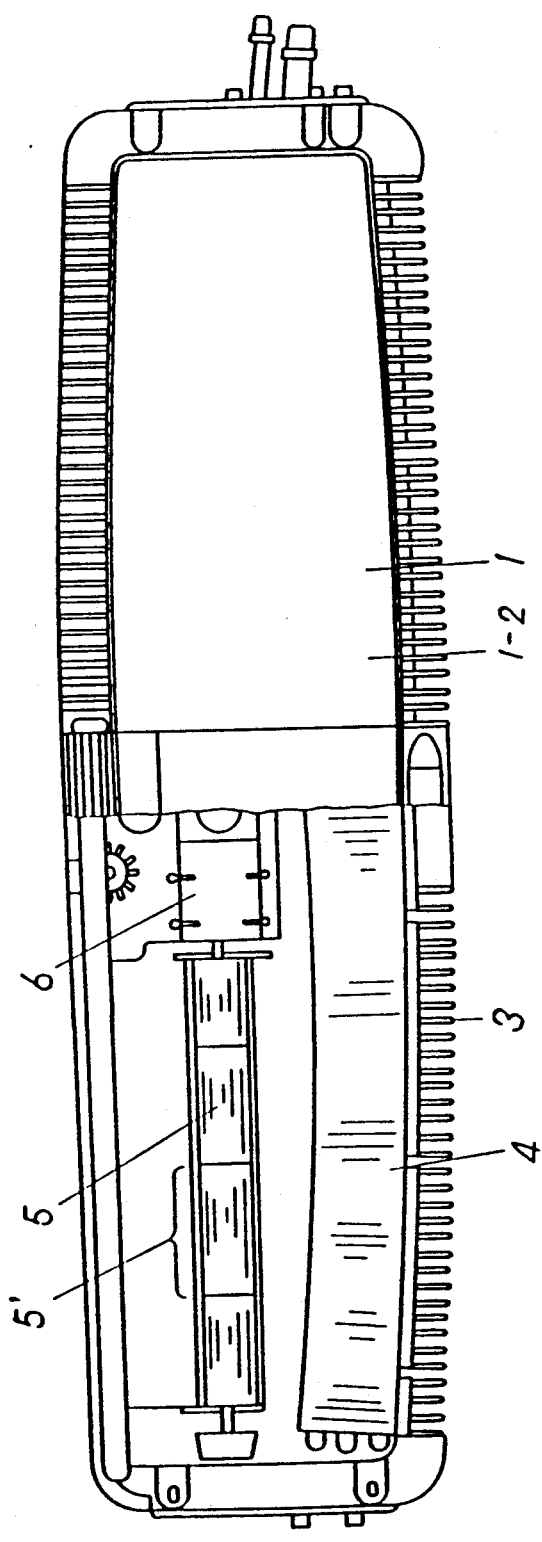
FIG. 1B is a bottom plan view, with a portion cut away, of the automobile air conditioner shown in FIG. 1A.

When viewed in FIG. 1B, an envelope line (not shown) along the side of an air inlet 3 and the side line of outlet 2 are formed in an arc shape such that the distance between the envelope line of air inlet 3 and the side line of air outlet 2 becomes maximum at the central portion thereof.

At air outlet 2, an upper edge 13 extends between the upper and lower casing 1—1 and 1-2. A lower edge 12 is defined in the elongated portion between the air outlet 2 and the lower casing 1-2.

The upper casing 1—1, the lower casing 1-2, the upper edge 13 and the lower edge 12 are curved along the curvature of the automobile compartment ceiling (not shown).

Referring to FIG. 1B showing bottom view of the automobile air conditioner according to the present invention, a fan motor 6 and a cylindrical blade wheel 5 are provided inside the main body 1 near the air outlet 2.

The cylindrical blade wheel 5 is connected to fan motor 6 with the axis in alignment with the axis of rotation of the motor. The elongated cylindrical blade wheel 5 extends generally parallel to the elongated direction of the main body such that the fan motor 6 can turn the cylindrical blade wheel 5. The cylindrical blade wheel 5 is constructed with a number of wheel units 5'.

An evaporator 4 is provided inside the main body near the air inlet 3, in order to effect heat exchange with the air taken through the air inlet 3.

Referring to FIG. 1C, the shows a cross section of the automobile air conditioner of the present invention installed on the ceiling of the automobile.

The evaporator 4 is provided in a slanted manner at a position adjacent the air inlet 3. The evaporator 4 has one end fixedly held on the upper casing 1—1 and the other end located on the lower casing 1-2 adjacent the air inlet 3.

The cylindrical blade wheel 5 is rotatably provided at about the center of the main body 1.

Reference numeral 7 designates a stabilizer and is formed by a lower diffuser 8 rising from the lower edge portion 12 of the air outlet 2 with an elevation angle $\alpha$ (FIG. 3A), a first ridge portion 9 connected to the lower diffuser 8 with a smooth curve, a second ridge portion 9' located upstream of the first ridge portion 9 and located below the cylindrical blade wheel 5, and a concave curved surface guide wall portion 10 extending between the first ridge portion 9 and the second ridge portion 9'. The space between the curved surface guide wall portion 10 and the cylindrical blade wheel 5 is gradually narrowed forwards the second ridge portion 9'.

Furthermore, a rear guide 11 having a center of curvature on the side of the cylindrical blade wheel 5 is integrally connected to a smooth curved upper diffuser 14 extending in the direction away from the cylindrical blade wheel 5. The rear guide 11 and the upper diffuser 14 are formed by an S-shaped cross section plate which defines an air passage together with the stabilizer 7.

Reference numeral 15 is a up-downward deflector blade mounted rotatably around a shaft extending in the horizontal direction and curved along the lower edge 12 and upper edge 13 of the air outlet 2. An outlet grille 16 is formed by a plurality of blades 17 extending between the upper edge portion 13 and lower edge portion 12 of the air outlet 2 at a predetermined spacing.

Figure 10:
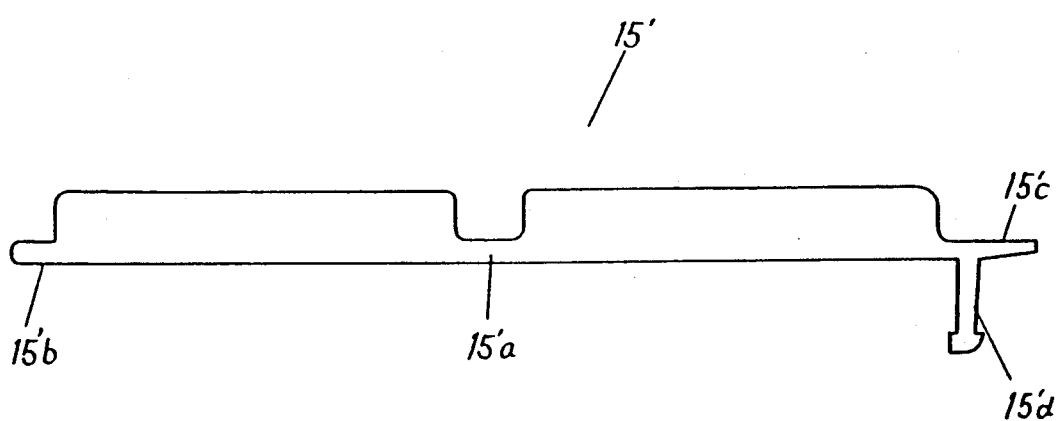
FIG. 10 is a detailed front view of the up-downward deflector blade shown in FIG. 1C.
Figure 11:
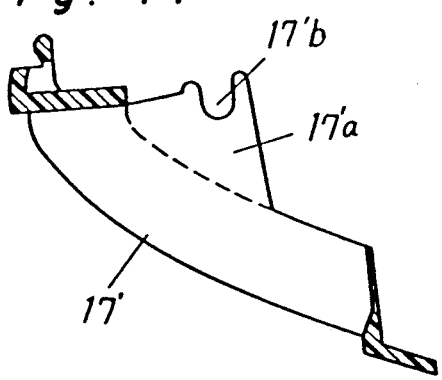
FIG. 11 is a cross-sectional view of the blade installed on the air-outlet portion of the arrangement shown in FIG. 1C.

The up-downward deflector blade 15 is curved along the curvature of the lower edge portion 12 and upper edge portion 13 of the air outlet 2. Here, in order to cause the up-downward deflector blade 4 to be curved along the curvature of the upper and lower edge portions 13 and 12 of the air outlet 2, there may be used, for example, a straight and flexible up-downward deflector blade 15' having engagement portions 15'a, 15'b and 15'c, as shown in FIG. 10, and at least one carrier blade 17' (FIG. 11) having a projecting portion 17'a and engagement recess 17'b for engaging the engagement portion 15'a of the up-downward deflecting blade 15' at area S indicated by a dotted line in FIG. 1A.

Figure 12:
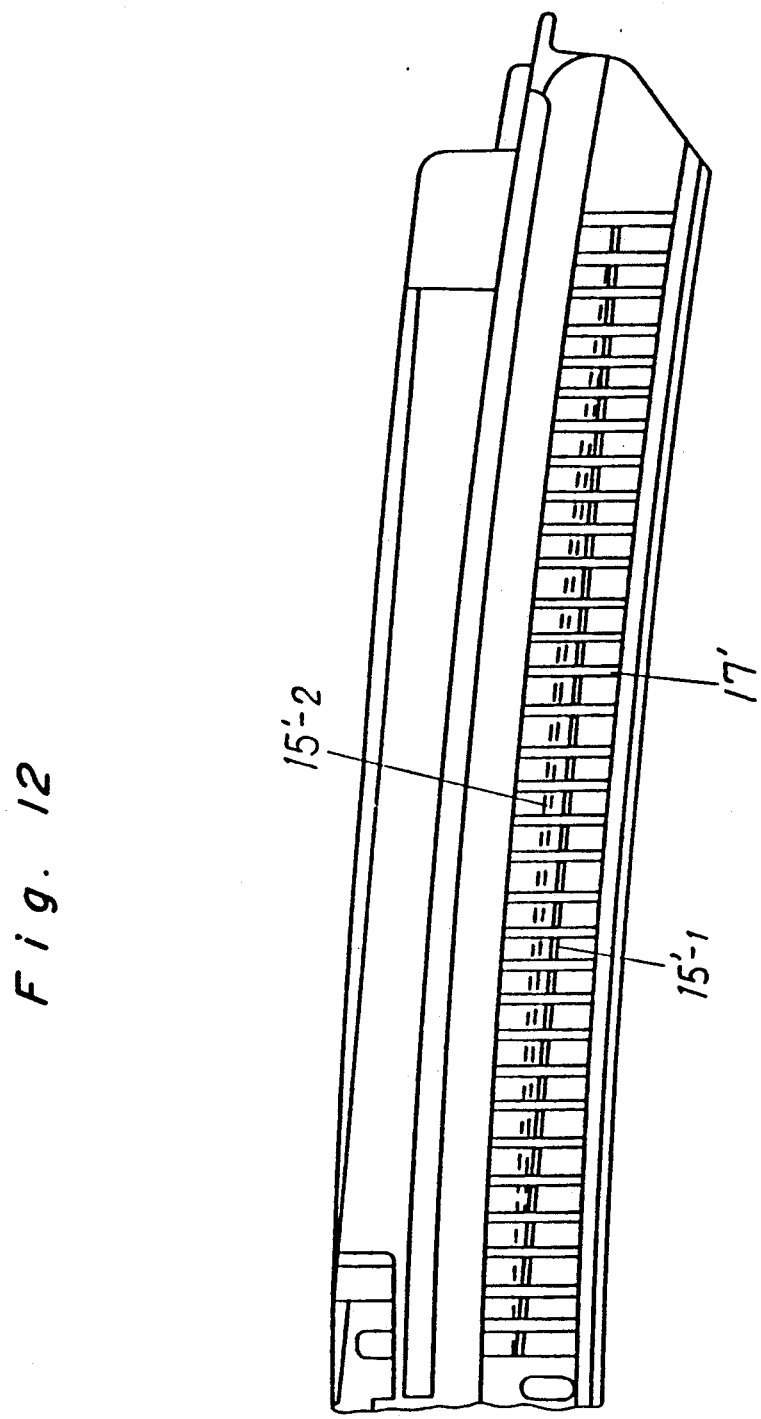
FIG. 12 is a fragmentary front view of the automobile air conditioner shown in FIG. 1A.

In the present embodiment, the engagement portions 15'b and 15'c of up-downward deflector blade 15' are inserted into engagement holes (not shown) provided at an equal height from the lower edge portion 12 on the left and right ends of the outlet grille 16. At this time, the up-downward deflector blade 15' is shaped in a straight line (indicated by reference numeral 15'-1 in FIG. 12).

The engagement recess 17'b of the carrier blade 17' is provided at a height from the lower edge portion 12 equal to the height of engagement holes (not shown) from the lower edge portion 12 for the engagement portions 15'b and 15'c provided on the left and right ends of the outlet grille 16. By engaging the engagement portion 15'a with the engagement recess 17'b, the up-downward deflector blade 15' is curved along the curvature of the lower and upper edge portions 12 and 13 of the air outlet 2 (The curved deflector blade 15'-2 is indicated by dotted line in FIG. 12).

Furthermore, reference numeral 18 designates a protruding beam provided in the direction across the air flow on the upper diffuser 14 and rising from the diffuser 14 at an acute angle, and the section of this protruding beam 18 is approximately that of a right triangle whose hypotenuse is a guide surface 19.

Referring to FIG. 1D, the automobile air conditioner main body 1 is divided into the upper casing 1—1 and the lower casing 1-2. On the upper casing 1—1, a fan unit comprising a cylindrical blade wheel 5, the fan motor 6 (see FIG. 1B), the stabilizer 7 and the rear guide 11, a fan switch 25, a register 22 and an evaporator 4 are fastened. Also, the fan switch 25 and the evaporator 4 are fastened to the upper casing by fastening members 20-1 and 20-2, respectively. The lower casing 1-2 is fittingly held to the bottom of the upper casing 1—1.

Figure 2:
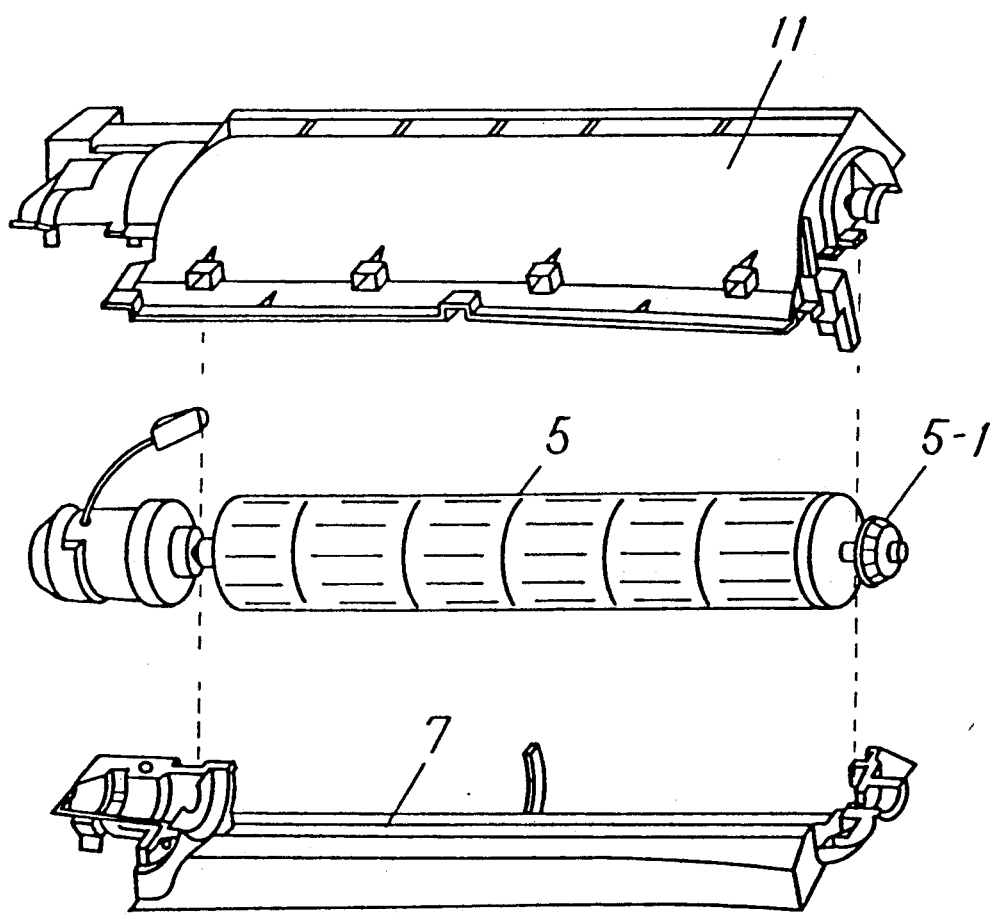
FIG. 2 is an exploded perspective view of a fan unit employed in the automobile air conditioner of FIG. 1A.

As shown in FIG. 2, the fan unit is constructed so as to hold the cylindrical blade wheel 5, the bearing 5-1 thereof and the fan motor 6 between the rear guide 11 and the stabilizer 7 having supports at opposite ends thereof which constitute an air passage. As shown in FIG. 1D, the fan unit is mounted on the inner surface of a convex portion 23 of the upper casing 1—1 by the fastening member 20. The main body 1 is attached to the automobile ceiling such that the convex portion 23 is accommodated in a concave portion 24 of insulating material provided in the ceiling.

Figure 3A:
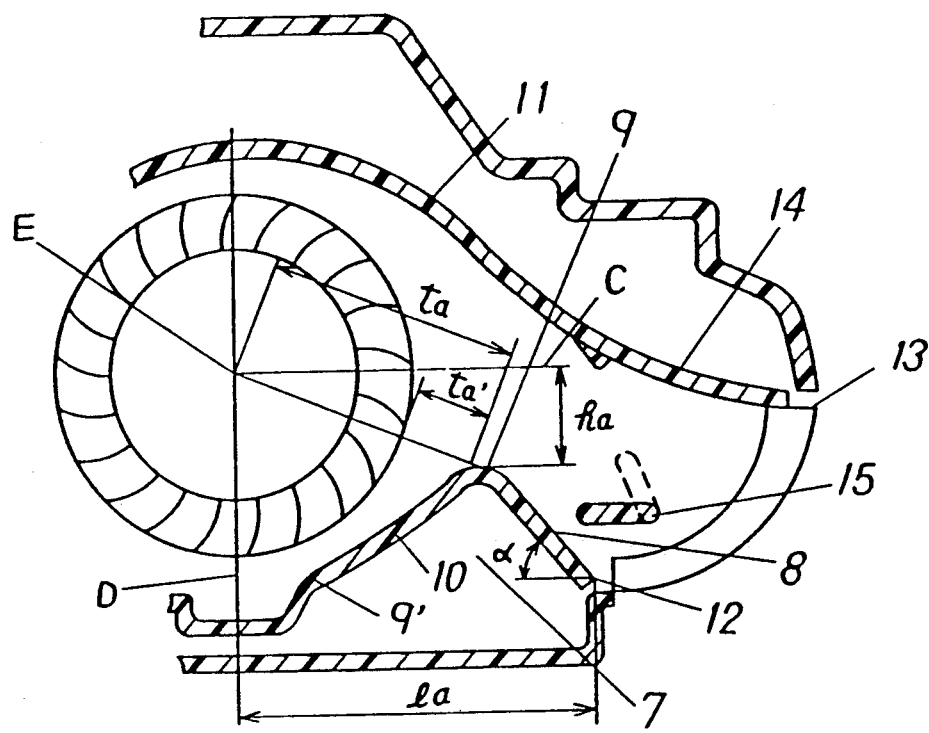
FIG. 3A is a cross-sectional view taken along a line IIIA—IIIA shown in FIG. 1A.
Figure 3B:
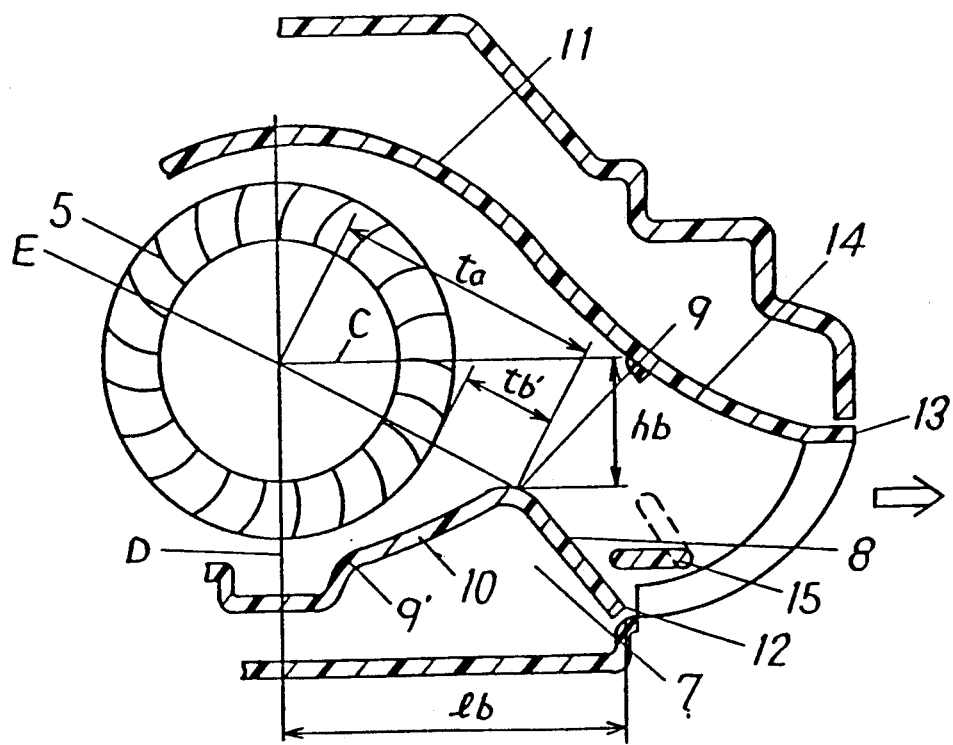
FIG. 3B is a cross-sectional view taken along a line IIIB—IIIB shown in FIG. 1A.

Referring to FIGS. 3A and 3B the difference in dimension of the automobile air conditioner at mid portion (FIG. 3A) and side portions (FIG. 3B) is shown.

The distance between the ridge portion 9 and a reference line C drawn horizontally from the axis E of the cylindrical blade wheel 5 is designated by h. The distance between a reference line D drawn vertically from the axis E of the cylindrical blade wheel 5 and the lower edge portion 12 of the air outlet 2 is designated by l. These distances in FIGS. 3A and 3B are respectively represented by ha, la; and hb, lb. According to the preferred embodiment, ha and hb or la and lb are not equal to each other, and the relationship that ha<hb and la>lb should be satisfied.

However, designating the distance between the ridge portion 9 and the cylindrical blade wheel 5 by t, and representing the distance t in FIGS. 3a and 3b by ta and tb, respectively, it is so arranged that the relationship ta=tb is satisfied. Here, the reason why la and lb are of the air outlet 2 is curved along the curvature of the main body 1 forming an arc surface, and at the same time is provided along the side surface on the air outlet 2. Distances ta' and tb' are the distances from the ridge portions to the periphery of blade wheel 5.

Figure 4:
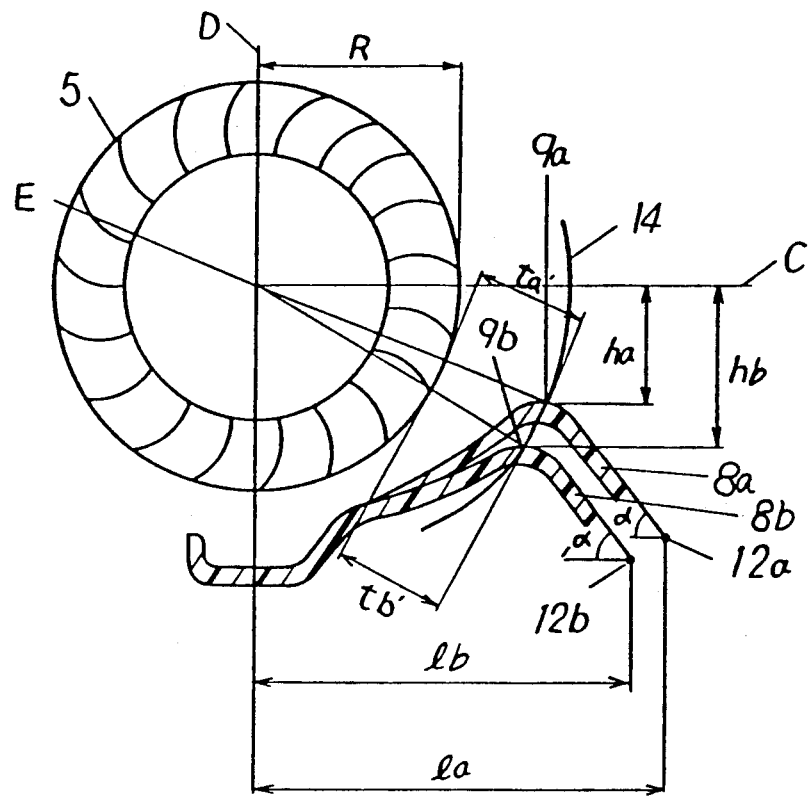
FIG. 4 is a diagrammatic view showing FIG. 3A and 3B superimposed to show various dimensions of the automobile air conditioner of the preferred embodiment of the present invention.

Referring to FIG. 4, the relationship between the cylindrical blade wheel 5 and the first ridge portion 9 is described. FIG. 4 is a drawing wherein section IIIA—IIIA and section IIIB—IIIB in FIG. 1 are superimposed and in order to clarify the difference between those sections. The first ridge portions 9 are designated by 9a and 9b for sections IIIA—IIIA and IIIB—IIIB, respectively, and the lower edge portions 12 are designated by 12a and 12b, respectively.

Reference character CIR designates the circumference of a circle having the center on the central axis E of the cylindrical blade wheel 5 and a radius larger than the radius R of the cylindrical blade wheel 5. Although the distance between the reference line C and the first ridge portion 9 varies, the first ridge portions 9a and 9b are arranged to be located on the circumference CIR. The lower diffuser 8a (or 8b) is arranged to rise from the lower edge 12 of the air outlet 2 at the elevation angle α which is constant at any section and is connected with the first ridge portion 9 in a smooth curve.

It is to be noted here that in FIG. 4, only two sections IIIA—IIIA and IIIB—IIIB are shown, needless to say, the relationship between the cylindrical blade wheel 5 and the stabilizer 7 are arranged in the same manner at any other sections between IIIA—IIIA and IIIB—IIIB.

Next, the result of a first air supply experiment conducted by the arrangement of the present embodiment will be described. In the experiment, a cylindrical blade wheel having an outer radius of 60.0 mm and inner radius of 44.0 mm and having 31 blades in the blade section 5 was used for the cylindrical blade wheel 5, and the distance t between the central axis E of the cylindrical blade wheel 5 and the first ridge portion 9 was set at 44.5 nm. Furthermore, distance between the central axis E of the cylindrical blade wheel 5 and the second ridge portion 9' was set at 36.0 mm, and the curvature radius $R_1$, $R_2$, and $_3$ of the concave surface 10, rear guide 11, and upper diffuser were set at $R_1=75$ mm, $R_2=40$ mm, and $R_3=80$ mm, respectively. The position of the ridge portion 9 was arranged as described hereinabove, and the elevation angle $\alpha$ of the lower diffuser 8 was set at $\alpha=50°$. Further, the rotation speed of the cylindrical blade wheel was set at 3000 rpm. And, the distance l between the reference line D and the lower edge portion 12 of the air outlet 2 was set at 59.6 mm at section A and at 67.7 mm at section B. The result of this experiment is shown in FIG. 5.

Figure 5:
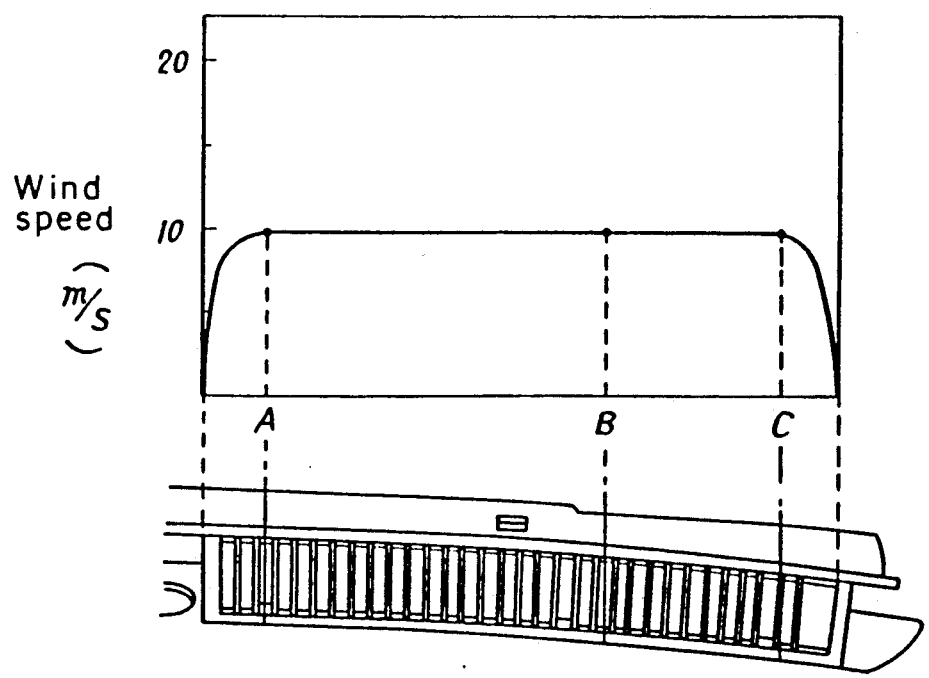
FIG. 5 is a diagrammatic view showing a relationship between the blow-out position and air speed.

By FIG. 5, it was confirmed that the air supply at a constant air speed of 10 m/s is obtained generally from all areas of the air outlet. In FIG. 5, a section C at which the distance l is 59.2 mm was also tested in addition to sections A and B. Therefore, wind speeds at three positions are plotted.

Figure 6:
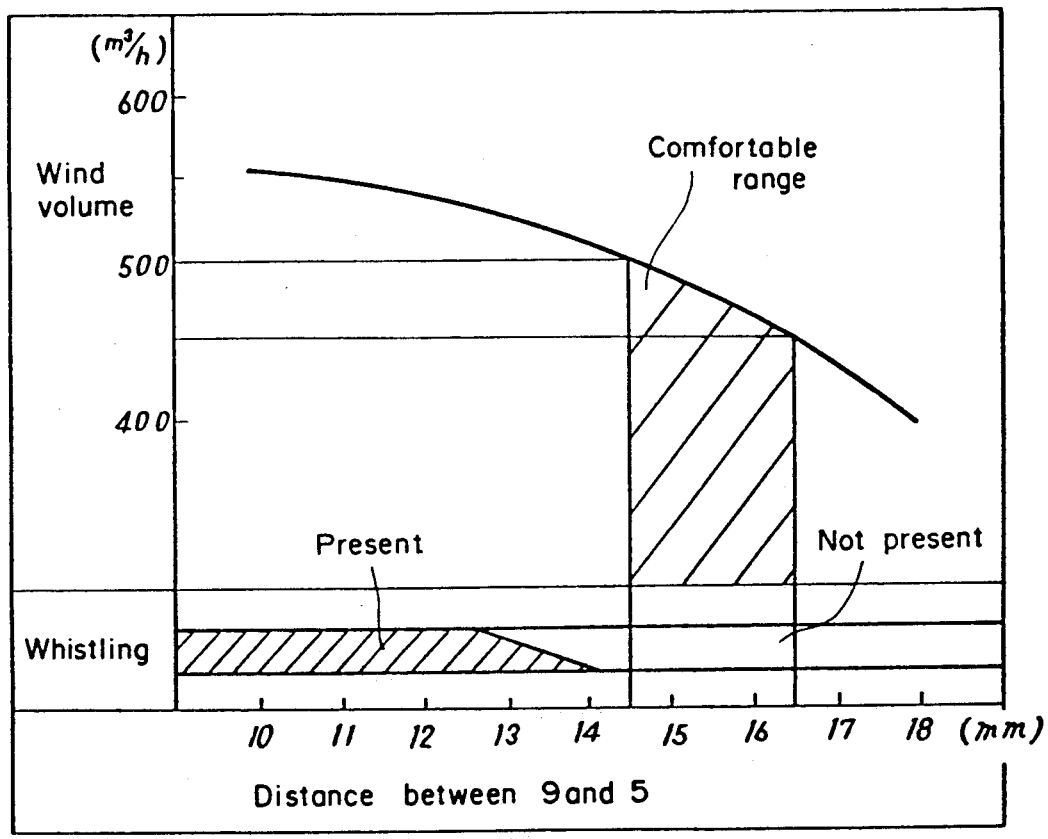
FIG. 6 is a graph showing a relationship between the distance between the ridge portion of the stabilizer and the cylindrical blade wheel, and air flow volume and whistling sound.

Referring to FIG. 6, a second experiment was conducted to obtain the relationship between the distance t between the first ridge portion 9 and the cylindrical blade wheel 5 and the air volume. Generally, the smaller the distance t', the larger the air volume obtained. However when this distance t' becomes too small, there takes place a whistling sound.

As described hereinabove, the present invention seeks to secure a sufficient amount of air supply and improve the air supply efficiency by making the air speed constant over entire range with a thin-type automobile air conditioner. Therefore, it is important to establish an optimum distance between the cylindrical blade wheel and the first ridge portion in a thin-type air conditioner and a practically applicable range of this distance.

In conducting this experiment, the cylindrical blade wheel 5 of the same dimensions as used in the previous experiment was used and the stabilizer 7 used was of the same shape as that of the previous experiment, with the distance between the cylindrical blade wheel 5 and the stabilizer 7 being changed. The result obtained from this experiment is shown in FIG. 6. From FIG. 6, it is understood that when the distance t' falls below 14 mm, whistling noises take place, and it is in the distance range of 14.5 mm to 16.5 mm that an air volume (450m$^3$/h to 500 m$^3$/h) sufficient to provide a comfortable air conditioning without occurrence of whistling noise is obtained.

Figure 7:
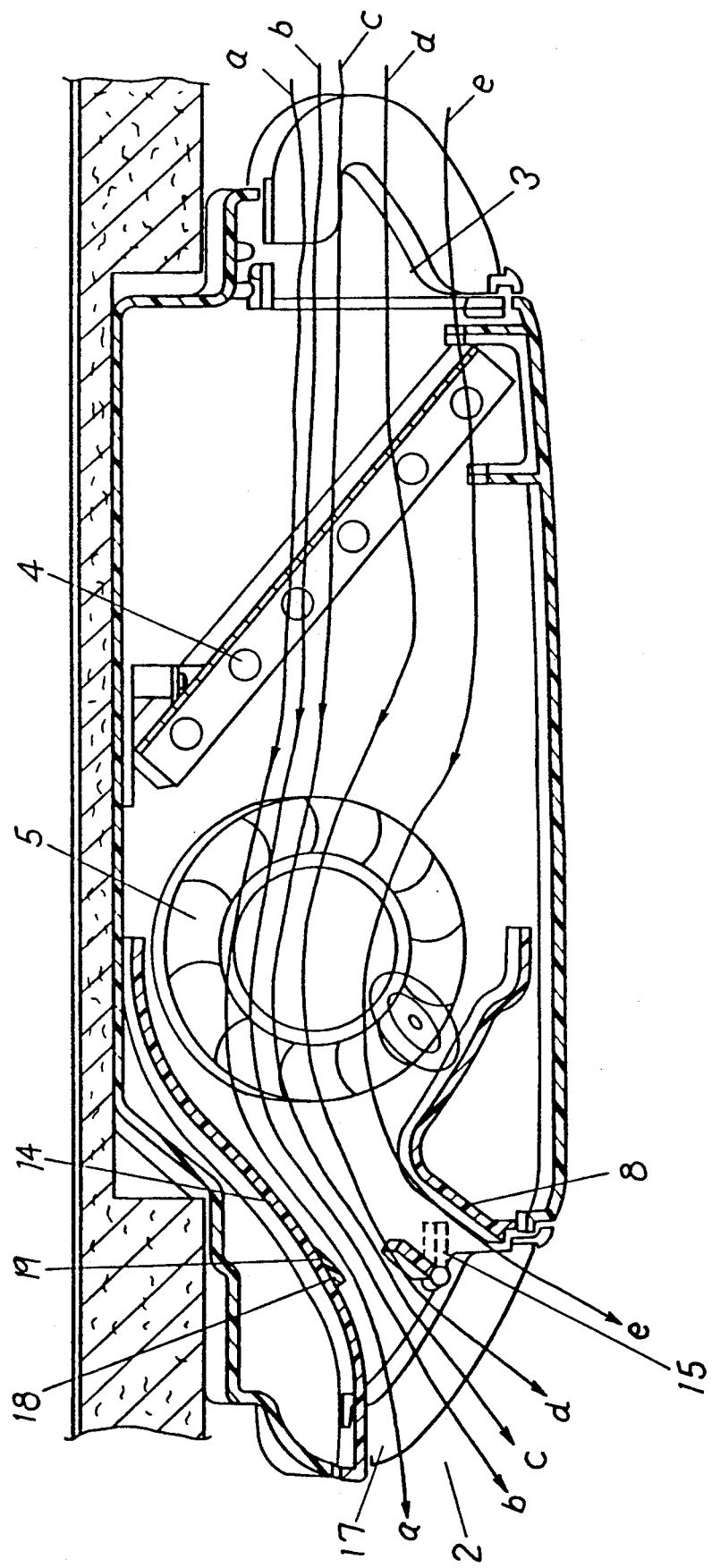
FIG. 7 is a view similar to FIG. 1C, but particularly showing lines of the air flow.

Referring to FIG. 7, the operation of the protruding 18 beam provided on the upper diffuser 14 will be described. The air taken in from the air inlet 3 is subjected to heat exchange by the evaporator 4 and the air subjected to heat exchange is discharged from the air outlet 2 after passing through the cylindrical blade wheel 5.

During this time, among the air flow which has passed through the cylindrical blade wheel 5, a part of the air flow (shown by arrow a) passing closely near the upper diffuser 14 flows in the direction of the front face of the air conditioner main body without flowing along the guide surface 19 of the protruding beam 18. But almost all air flow (shown by arrows b and c) passing near the upper diffuser 14 is pushed away from the curved surface of the upper diffuser 14 by the protruding beam 18 and deflected downward. The air flow (arrow d and e) passing adjacent the lower diffuser 8 and the central portion of blades 17 is forwarded downward by the effect of downward air flow indicated by arrows b and c.

It is to be noted here that the blow angle of air blowing out from the air outlet 2 can be adjusted by adjusting the tilt angle of the up-downward deflector blade 15. For example, by tilting the up-downward deflector blade 15 by a sufficiently large angle (about 50° to 55°) with respect to the horizontal line, air can be blown out further downward. On the other hand by setting the up-downward deflector blade 15 horizontally, the air flowing direction can be set approximately in the horizontal direction.

Referring to FIGS. 8A, 8B, 8C, 8D and 8E, and FIGS. 9A, 9B, 9C, 9D, 9E, 9F and 9G, a third experiment was conducted to obtain a relationship between the shape and position of the protruding beam 18 and the blow-out angle.

FIGS. 8A to 8C show sections of the protruding beam 18 used in the experiment, wherein a triangle side extending between the smallest angle of the three angles of the right triangle and a right angle is bent along the curved surface of the upper diffuser 7. Three apexes of the section of protruding beam 18 are represented by A, B and C, and the length between A and B is represented by x and the length between A and C is represented by y, and in FIGS. 8A to 8C, these length are represented by $x_a$, $x_b$, $x_c$ and $y_a$, $y_b$, $y_c$. In FIG. 8A, it was set that $y_a=($ mm, $x_a=5$ mm, and in FIG. 8B, it was set that $y_b=9$ mm, $x_b=8$ mm, and in FIG. 8C, it was set that $y_c=9$ mm, $x_c=3$ mm.

Figure 9A:
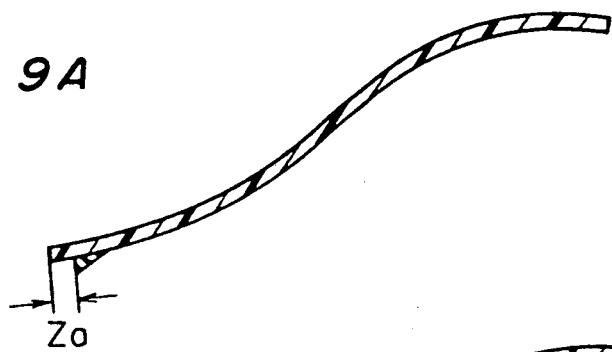
FIGS. 9A, 9B, 9C, 9D, 9E, 9F and 9G are cross-sectional views of the diffuser showing different installation positions of the protruding beam shown in FIG. 1C.
Figure 9B:
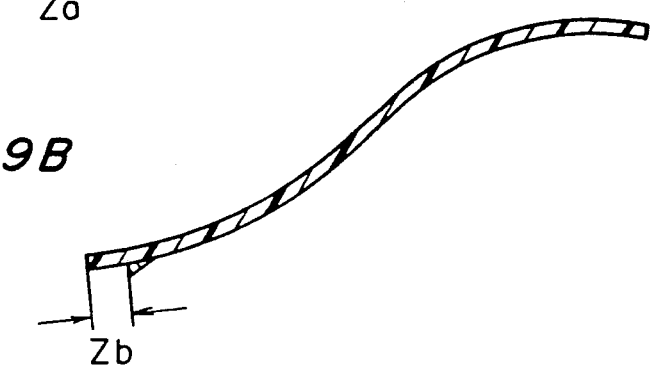
Figure 9C:
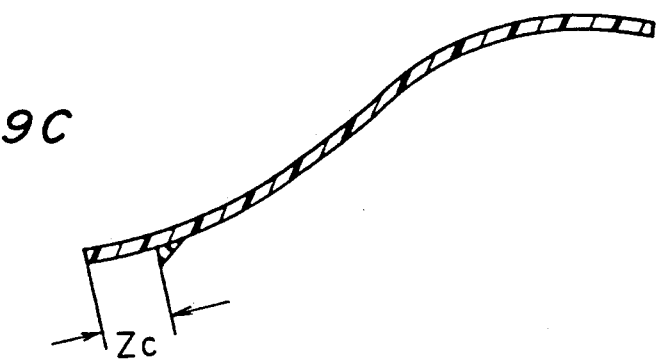
Figure 9D:
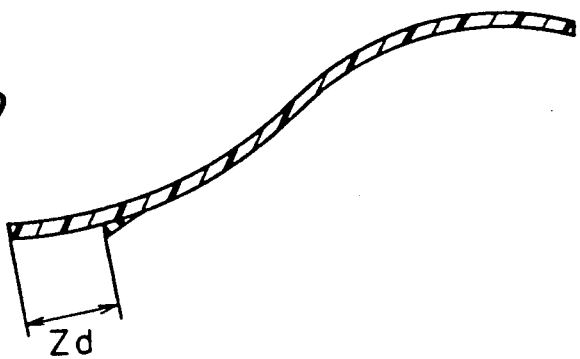
Figure 9E:
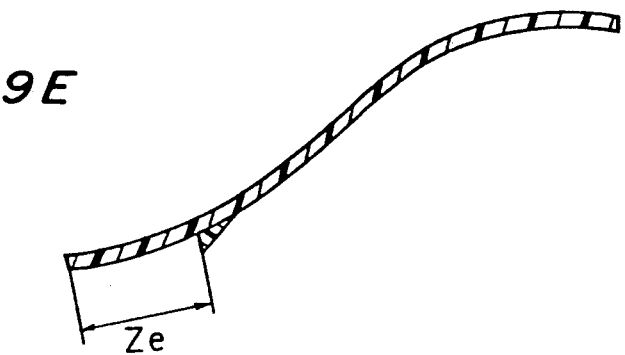
Figure 9F:
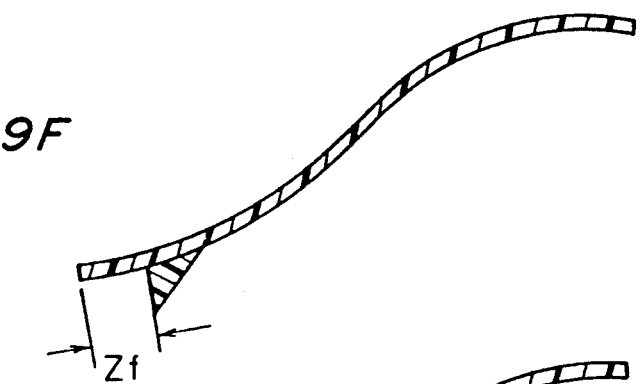
Figure 9G:
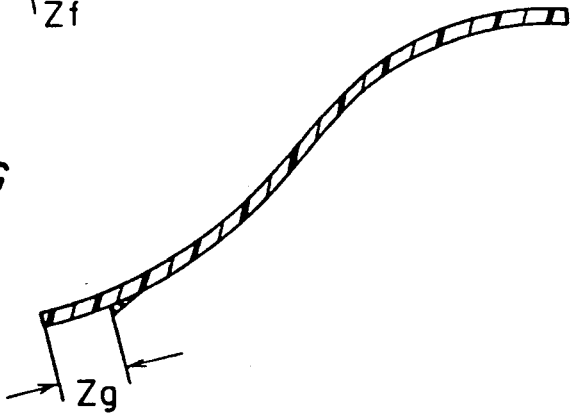

As shown in FIGS. 9A to 9G, by changing the distance z between the upper edge 13 of the air outlet 2 and the side AB on the section of the protruding beam 18, the change in the blow-out angle was measured. In FIGS. 9A to 9E, a protruding beam of FIG. 8B was used. In FIG. 9F, a protruding beam of FIG. 8B was used. In FIG. 9G, a protruding beam of FIG. 8C was used. Blow-out angles relative to the horizontal surface are shown in the following table when the distance z was set at $z_a=5$ mm, $z_b=10$ mm, $z_c=15$ mm, $z_d=20$ mm, $z_e=25$ mm, $z_f=15$ mm, $z_g=15$ mm for the arrangement of FIGS. 9A to 9G, respectively.

It is to be noted that the distance between the cylindrical blade wheel 5 and the ridge portion 9 was set at the same value as that in the first experiment.

TABLE

|  | beam shape | z (mm) | blow angle(°) |
|---|---|---|---|
| FIG. 9A | FIG. 8A | 5 | 25 to 30 |
| FIG. 9C | FIG. 8A | 10 | 30 to 40 |
| FIG. 9C | FIG. 8A | 15 | 40 to 45 |
| FIG. 9D | FIG. 8A | 20 | 45 to 50 |
| FIG. 9E | FIG. 8A | 25 | 45 to 50 |
| FIG. 9F | FIG. 8B | 15 | 50 to 55 |
| FIG. 9G | FIG. 8C | 15 | 40 to 45 |

From this experiment, it is understood that a preferable blow-out angle can be obtained when the distance z between the upper edge 13 of the air outlet 2 and the protruding beam 18 is set at 15 mm to 25 mm in the present embodiment. When air supply in the horizontal direction is desired, it is enough to set the up-downward deflector blade 15 horizontally.

It is to be noted here that the protruding beam 18 is not limited to those shown in FIGS. 8A to 8C having a right triangle shape, but instead, a triangle shape having one obtuse angle and two acute angles, as shown in FIG. 8D, or a shape having a curved guide surface 19-5, as shown in FIG. 8E may be used.

As described hereinabove, according to the present embodiment, since the forcibly formed vortexes can be stabilized, it is possible to supply air at a constant speed and air flow from the entire area of the air outlet 2 and the air supply efficiency is improved without generating noise and whistling sound. Furthermore, since the elevation angle α of the lower diffuser 8 is constant, the air flow angle is stabilized in the forward direction of the air conditioner, resulting in a comfortable air conditioning.

Further, according to the present embodiment, by setting the up-downward deflector blade 15 downward as shown by the solid line in FIG. 1C, and supplying air slanted downward, the air conditioning of the automobile compartment can be effected rapidly. Further, when the compartment has reached a comfortable temperature, since air supply can be produced in the horizontal direction by setting the up-downward deflector blade 16 horizontally, the passenger will not feel uncomfortable due to air blowing directly on him.

Furthermore, according to the present embodiment, when functional components such as the fan switch 25 and the register 22 are broken, they can be easily replaced without detaching the automobile air conditioner, i.e., by merely removing the lower casing 1-2 and loosening the fastening members fastened to the upper casing 1—1, providing good serviceability.

Further, since the fan unit is installed in the ceiling such that the convex portion of the upper casing 1—1 is fitted in the concave recess in the insulation material for the automobile ceiling insulation, the vibration of the fan motor 6 can be suppressed because of the rigidity of the compartment ceiling.

Furthermore, since the clearance between the cylindrical blade wheel 5 and the rear guide 11, and the clearance between the cylindrical blade wheel 5 and the stabilizer 7 are maintained constant along the axial direction of the cylindrical blade wheel 5, the air supply is stabilized. Such constant clearances are achieved by the air passage formed integrally with the fan unit.

Furthermore, even when the upper casing 1—1 and the lower casing 1-2 are removed for the overall repair and reassembled, the air blowing characteristics of the cylindrical blade wheel 5 will not be changed and no abnormal noise will be generated, because the air passage is formed integrally with the fan unit.

Next, a modification of the above described embodiment is described. The modification is in the shape of the stabilizer 7.

Figure 13:
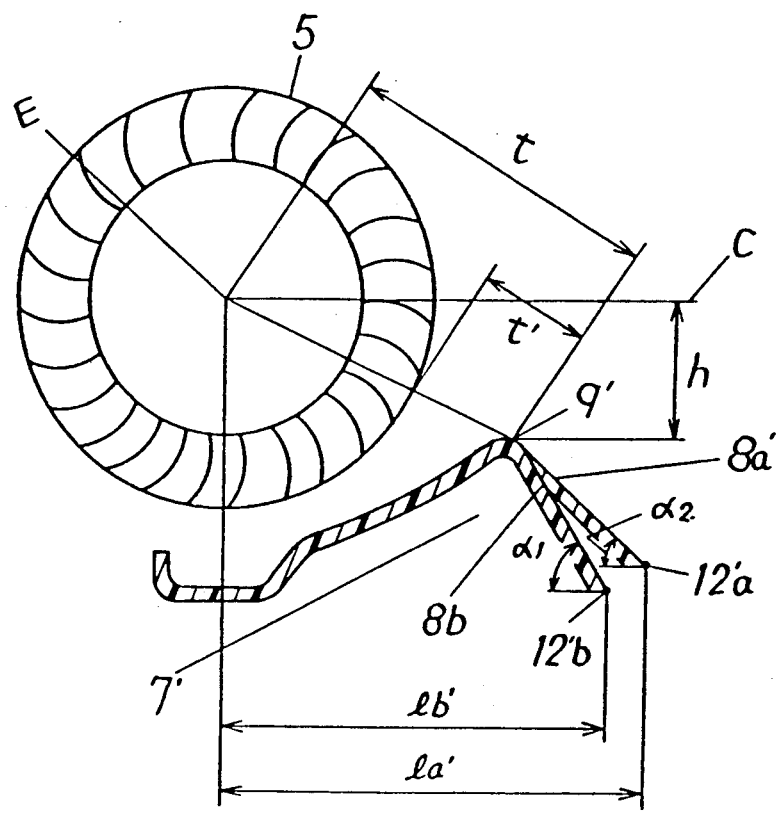
FIG. 13 is a view similar to FIG. 4, but particularly showing various dimensions according to a modification of the preferred embodiment of the present invention.
Figure 14:
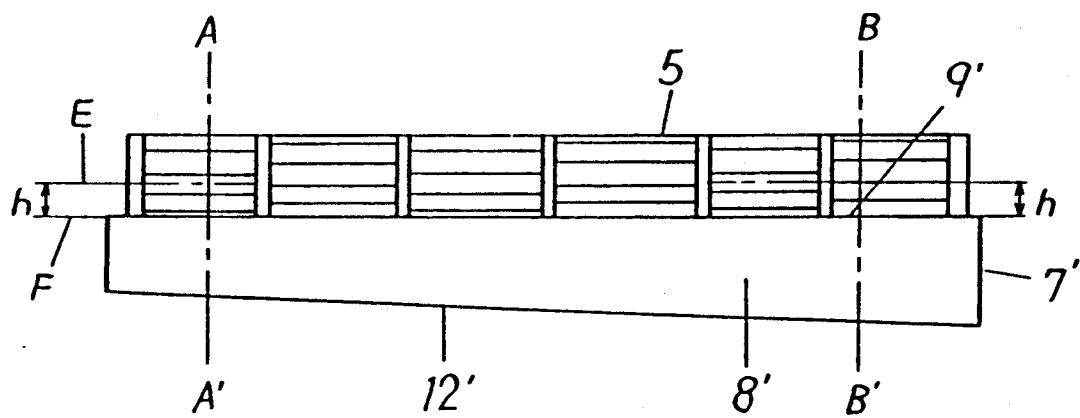
FIG. 14 is a front view showing a location of the cylindrical blade wheel with respect to the stabilizer in accordance with that shown in FIG. 13.

Referring to FIG. 13, a superimposed view of cross-sections IIIA—IIIA and IIIB—IIIB shown in FIG. 1A is shown. As shown in FIGS. 13 and 14, the ridge portion 9' is spaced away from the axial center E of the cylindrical blade wheel 5 by a constant distance t, and is in alignment with a line F (FIG. 14) which is parallel to the axis of the FIG. 13, the ridge portion 9' is located below the reference line C (horizontally drawn from the axial center E) by a distance h. The diffuser 8'a or 8'b rises from the lower edge portion 12' toward the ridge portion 9'.

As described above, according to the modification, since the elevation angle α of diffuser 8' is not constant, the state of forcibly formed vortexes and stability thereof is somewhat inferior as compared with the earlier described preferred embodiment of the present invention. However, it is possible to blow out the air generally at a constant air speed at any position of the air outlet 2, and the generation of unwanted noise can be prevented, resulting in a comfortable air conditioning.

Figure 15:
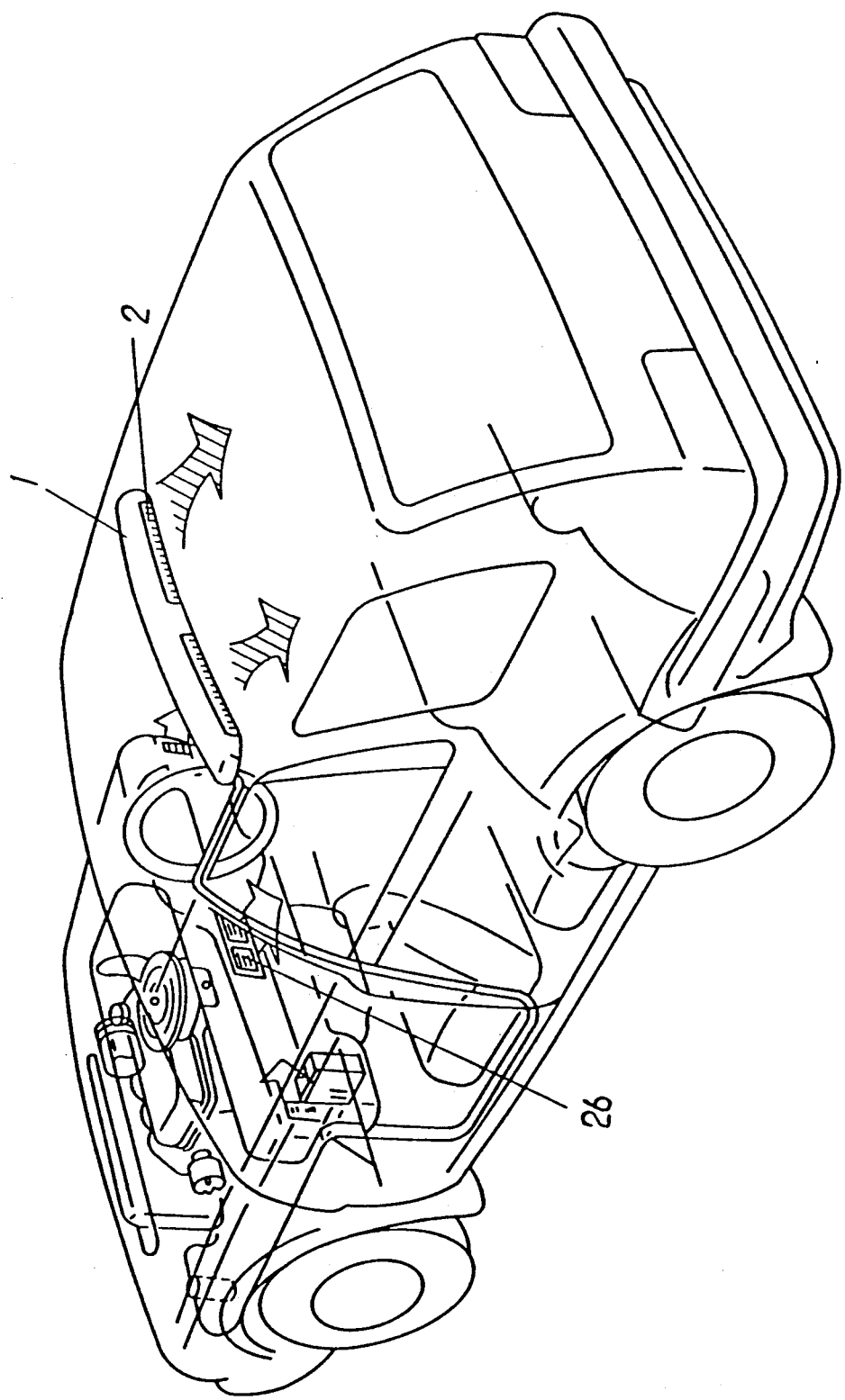
FIG. 15 is a schematic perspective view of an automobile body equipped with the air conditioner according to the present invention.

Referring to FIG. 15, the automobile air conditioner according to the preferred embodiments is installed in the central portion of the compartment ceiling so that the air outlet 2 is directed to the rear passenger seat. When the automobile air conditioner is installed as shown, an automobile air conditioner 26 installed on the dash board can be used particularly for the front seat passengers and the automobile air conditioner of the present invention can be used particularly for the rear seat passengers individually. Furthermore, when both air conditioners are operated simultaneously, a continuous air flow can be achieved from the dash panel to the rear window along the ceiling surface. This is suitable for cooling the ceiling surface which otherwise would generate the maximum radiation heat. Thus, a rapid and uniform air conditioning can be effected in the compartment of the automobile.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An automobile air conditioner for use in an automobile having a ceiling, comprising:
   a generally rectangular box shaped casing being curved in a vertical direction along with a curvature of said ceiling, and including a first wall and a second wall to define an air inlet and an air outlet at opposite sides thereof, said air outlet being configured by a first edge along one side of said first wall and a second edge along one side of said second wall;
   a generally elongated evaporator accommodated in said casing adjacent said air inlet and having one end thereof being fixedly connected to said first wall;
   a fan means accommodated in said casing at a position between said evaporator and said air outlet, for generating air movement in a direction from said air inlet to said air outlet, said fan means having a cylindrical blade wheel with an axis thereof extending substantially parallel to said first wall and perpendicular to said direction of air movement; and
   a stabilizer located adjacent said second wall and comprising:
   a lower diffuser rising from said second edge at a predetermined elevation angle; and
   a guide wall portion, having one side thereof integrally connected to said lower diffuser through a ridge portion, and spaced from said cylindrical blade wheel for defining an air guide space between said guide wall portion and said cylindrical blade wheel which is gradually narrowed towards another side of said guide wall portion remote from said one side, said ridge portion extending approximately parallel to said axis and being curved correspondingly to the curvature of said casing, said ridge portion being equidistantly spaced from said axis.

2. An automobile air conditioner as claimed in claim 1, further comprising and an air flow deflector located between said cylindrical blade wheel and said air outlet and rotatably mounted for controlling the air flowing direction from said air outlet.

3. An automobile air conditioner as claimed in claim 1, further comprising a rear guide located adjacent said first wall and integrally connected to a smooth curved upper diffuser extending in a direction away from said fan means to form an S-shaped cross section plate which forms an air passage together with said stabilizer.

4. An automobile air conditioner as claimed in claim 3, further comprising a protruding beam extending in a direction parallel to said axis of said cylindrical blade wheel and mounted on said upper diffuser.

5. An automobile air conditioner as claimed in claim 1, wherein said first wall has a convex portion adapted to be inserted in a concave recess formed in said automobile ceiling.

6. An automobile air conditioner as claimed in claim 1, wherein said casing has a configuration with opposite sides thereof where said air inlet and said air outlet are formed are curved outwardly so that the distance between the centers of opposite sides becomes maximum.

7. A fan unit for use in an automobile air conditioner having a casing curved in a vertical direction to accommodate the curvature of a roof of an automobile, said fan unit comprising:

an elongated air flow stabilizer having supports at opposite ends thereof, a second end at a downstream end of said stabilizer, a lower diffuser rising from said second edge at a predetermined elevation angle, a guide wall portion having one side thereof integrally connected to said lower diffuser through a ridge portion;

an elongated rear guide integrally connected to a smooth curved upper diffuser and being positioned above and spaced from said stabilizer to define a compartment therebetween;

a cylinder blade wheel mounted in said compartment and having a shaft mounted in said supports; and a motor connected to said cylinder blade wheel with the axis of rotation of said motor in alignment with the axis of rotation of said cylinder blade wheel;

said guide wall portion defining an air guide space between said guide wall portion and said cylinder blade wheel which is gradually narrowed toward another side of said guide wall portion remote from said one side, said ridge portion extending in a curved line corresponding to the curvature of said casing and with the points along said ridge being equidistant from said axis of rotation of said motor and cylinder blade wheel.

* * * * *